(12) United States Patent
Yuan et al.

(10) Patent No.: US 9,300,622 B2
(45) Date of Patent: Mar. 29, 2016

(54) METHOD FOR OBTAINING DNS AND TUNNEL GATEWAY DEVICE

(75) Inventors: Liquan Yuan, Shenzhen (CN); Chao Qin, Shenzhen (CN); Peng Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 141 days.

(21) Appl. No.: 13/636,489

(22) PCT Filed: Jul. 28, 2011

(86) PCT No.: PCT/CN2011/077751
§ 371 (c)(1),
(2), (4) Date: Sep. 21, 2012

(87) PCT Pub. No.: WO2013/034456
PCT Pub. Date: Mar. 22, 2012

(65) Prior Publication Data
US 2013/0166715 A1    Jun. 27, 2013

(30) Foreign Application Priority Data

Sep. 16, 2010  (CN) .......................... 2010 10 288987

(51) Int. Cl.
*G06F 15/16* (2006.01)
*H04L 29/12* (2006.01)
*H04L 12/46* (2006.01)
*H04L 12/24* (2006.01)

(52) U.S. Cl.
CPC ............ *H04L 61/10* (2013.01); *H04L 12/4633* (2013.01); *H04L 61/1511* (2013.01); *H04L 41/0213* (2013.01)

(58) Field of Classification Search
None
See application file for complete search history.

(56) References Cited

U.S. PATENT DOCUMENTS

| 7,526,562 | B1 | 4/2009 | Samprathi et al. | |
| 7,565,423 | B1 * | 7/2009 | Fredricksen | 709/223 |
| 2004/0153502 | A1 * | 8/2004 | Jiang | 709/203 |
| 2004/0240468 | A1 | 12/2004 | Chin et al. | |
| 2007/0242672 | A1 * | 10/2007 | Grayson et al. | 370/392 |
| 2008/0263654 | A1 * | 10/2008 | Bahl et al. | 726/15 |
| 2008/0320111 | A1 * | 12/2008 | Yan et al. | 709/220 |
| 2009/0054037 | A1 * | 2/2009 | Kaippallimalil | 455/411 |
| 2009/0100176 | A1 * | 4/2009 | Hicks et al. | 709/224 |
| 2009/0265543 | A1 * | 10/2009 | Khetawat et al. | 713/151 |

(Continued)

FOREIGN PATENT DOCUMENTS

| CN | 2009135986 A1 | 11/2009 |
| CN | 101790146 A | 7/2010 |

OTHER PUBLICATIONS

International Search Report for PCT/CN2011/077751 dated Oct. 27, 2011.

*Primary Examiner* — Brian J Gillis
*Assistant Examiner* — Kamran Mohammadi
(74) *Attorney, Agent, or Firm* — Banner & Witcoff, Ltd.

(57) ABSTRACT

The present invention provides a tunnel gateway device used for: receiving a domain name system (DNS) server address for an inner layer or outer layer service of a tunnel configured by an automatic control server according to a management protocol; and taking its own address as the DNS server's address and sending the address to a client, or sending the configured DNS server address to the client. The present invention also provides a method for obtaining the DNS, and the present invention implements the DNS server distribution and obtaining of the DNS without depending on the address protocol.

4 Claims, 3 Drawing Sheets

(56) References Cited

U.S. PATENT DOCUMENTS

| | | | |
|---|---|---|---|
| 2010/0036959 A1* | 2/2010 | Trace et al. | 709/228 |
| 2010/0057921 A1* | 3/2010 | Zhang et al. | 709/228 |
| 2010/0217890 A1* | 8/2010 | Nice et al. | 709/245 |
| 2010/0235433 A1* | 9/2010 | Ansari et al. | 709/203 |
| 2011/0019677 A1* | 1/2011 | Townsley et al. | 370/401 |
| 2011/0306332 A1* | 12/2011 | Macpherson | 455/419 |
| 2011/0307629 A1* | 12/2011 | Haddad | 709/245 |
| 2013/0060965 A1* | 3/2013 | Peng et al. | 709/245 |

* cited by examiner

METHOD FOR OBTAINING DNS AND TUNNEL GATEWAY DEVICE

TECHNICAL FIELD

The present invention relates to the data communication technology, and in particular, to a method for obtaining a domain name system (DNS) in a tunnel situation and a tunnel gateway device.

BACKGROUND OF THE RELATED ART

With the flourishing development of the Internet, in the near future that can be estimated, the IPv4 global unicast address used by the global Internet user at present will be exhausted progressively; and with the growing up of the concept of the Ubiquitous Network and the construction demand of the Internet of Things in the global range, the IPv6, as the major network layer technology of the Next-Generation Internet (abbreviated as NGI), is gradually getting into the role.

In order to deploy rapidly in the evolution process to the IPv6, the IETF has provided the slight-technology-level dual stack-lite (DS-LITE) based on the tunnel and the IPv6 rapid deployment (6rd), and both kinds of technologies use the tunnel technology.

The DS-LITE provides the method for bearing the IPv4 data service by using the IPv6 tunnel; one end of the DS-LITE can be in the home gateway, and the other end locates at the boundary of the IPv4/IPv6. The DS-LITE is not limited to the connection way of the IPv6, and can access through the ways, such as, the Point to Point protocol over Ethernet (PPPoE) or the IP over Ethernet (IPoE), etc., while for the IPv4 client within the tunnel, it has no regulation on how to obtain the DNS yet. As to the 6rd, the tunnel of the IPv4 is used to bear the IPv6 data service, one end of the 6rd can be in the home gateway, and the other end locates in the boundary of the IPv4/IPv6; as to the IPv6 client within the tunnel, there is a scheme supporting the DNS Server carrying the IPv6 by expanding the DHCPv4 protocol now, thus configuring the DNS server of the 6rd corresponding to the IPv6.

To obtain the DNS server by using the Dynamic Host Configuration Protocol (DHCP), it must support the DHCP protocol; if in the situation that it does not support the DHCP protocol, the home gateway based on the tunnel way is unable to obtain the DNS server.

CONTENT OF THE INVENTION

The present invention provides a method for obtaining a DNS and a tunnel gateway device, to implement the distribution of the DNS in the tunnel way.

In order to solve the above-mentioned problem, the present invention provides a tunnel gateway device, configured to:

receive a domain name system (DNS) server address for an inner layer or outer layer service of a tunnel configured by an automatic control server according to a management protocol; and take the tunnel gateway device's address as the DNS server's address and send the address to a client, or sent the received DNS server's address to the client.

Alternatively, the above device may have the following features: the tunnel gateway device is further configured to: receive a DNS request from the client, or obtain IP address information corresponding to the DNS request from the local DNS server or the DNS server, and return the corresponding IP address information to the client.

Alternatively, the above device may have the following features: the tunnel gateway device is configured to obtain IP address information corresponding to the DNS request from the local DNS server or the DNS server according to the following way:

after receiving the DNS request, searching DNS items stored locally, when there is a matched DNS item in local, obtaining the IP address information corresponding to the DNS request; when there is no matched DNS item in local, obtaining the matched DNS item from the configured DNS server, and obtaining the IP address information corresponding to the DNS request according to the matched DNS item; or, after receiving the DNS request, obtaining the matched DNS item from the configured DNS server, and obtaining the IP address information corresponding to the DNS request according to the matched DNS item.

Alternatively, the above device may have the following features: the tunnel gateway device is further configured to: store the DNS item obtained from the DNS server, and when storing the DNS item, if local DNS item record is already full, then delete the local DNS item according to aging policy, for example, storage time and/or use frequency of the DNS item.

Alternatively, the above device may have the following features: the tunnel gateway device is further configured to: receive the DNS request of the client, transparently forward the DNS request to the DNS server, and transparently forward the IP address information returned by the DNS server back to the client.

Alternatively, the above device may have the following features: the tunnel gateway device supports a slight-level dual stack-lite (DS-LITE) and/or an IPv6 rapid deployment (6rd) technology.

Alternatively, the above device may have the following features: the management protocol is a TR069 protocol or other terminal control protocol.

The present invention also provides a method for obtaining a domain name system (DNS), comprising:

an automatic control server configuring a domain name system (DNS) server address for an inner layer or outer layer service of a tunnel on a tunnel gateway device according to a management protocol; and the tunnel gateway device taking a local address thereof as the DNS server's address and sending the address to a client, or the tunnel gateway device sending the configured DNS server's address to the client.

Alternatively, the above device may have the following features: when the tunnel gateway device takes an address thereof as the DNS server's address and sending the address to the client, further comprising:

the client sending a DNS request to the tunnel gateway device; and the tunnel gateway device obtaining IP address information corresponding to the DNS request from the local or the configured DNS server, and returning the IP address information corresponding to the DNS request to the client.

Alternatively, the above device may have the following features: the step of the tunnel gateway device obtaining IP address information corresponding to the DNS request comprises:

the tunnel gateway device, after receiving the DNS request, searching DNS items stored locally, when there is a matched DNS item in local, obtaining the IP address information corresponding to the DNS request according to the matched DNS item; when there is no matched DNS item in local, obtaining the matched DNS item from the configured DNS server for the inner layer or outer layer service of the tunnel, and obtaining the IP address information corresponding to the DNS request according to the matched DNS item; or, the tunnel gateway device, after receiving the DNS request, obtaining the matched DNS item from the configured DNS server, and obtaining the IP address information corresponding to the DNS request according to the matched DNS item.

Alternatively, the above device may have the following features: the tunnel gateway device storing the DNS item obtained from the DNS server, and when storing the DNS item, if local DNS item record is already full, then deleting the local DNS item according to aging policy, for example, storage time and use frequency of the DNS item.

Alternatively, the above device may have the following features: when the tunnel gateway device sends the DNS server's address to the client, further comprising: the tunnel gateway device receiving the DNS request of the client, transparently forwarding the DNS request to the DNS server, and transparently forwarding the IP address information returned by the DNS server back to the client.

Alternatively, the above device may have the following feature: the tunnel gateway device supports a slight-level dual stack-lite (DS-LITE) and/or an IPv6 rapid deployment (6rd) technology.

Alternatively, the above device may have the following feature: the management protocol is a TR069 protocol or other terminal control protocol.

The embodiment of the present invention provides a method for distributing the DNS server without depending on the address protocol and method for the client obtaining the DNS. In the embodiment of the present invention, the configuration way can be unified by configuring the address of the DNS Server through the management protocol. The gateway buffers the corresponding DNS item and responds to the DNS request sent by the client, which reduces the request quantity sent to the remote DNS server by the client.

PREFERRED EMBODIMENTS OF THE PRESENT INVENTION

Figure 1:
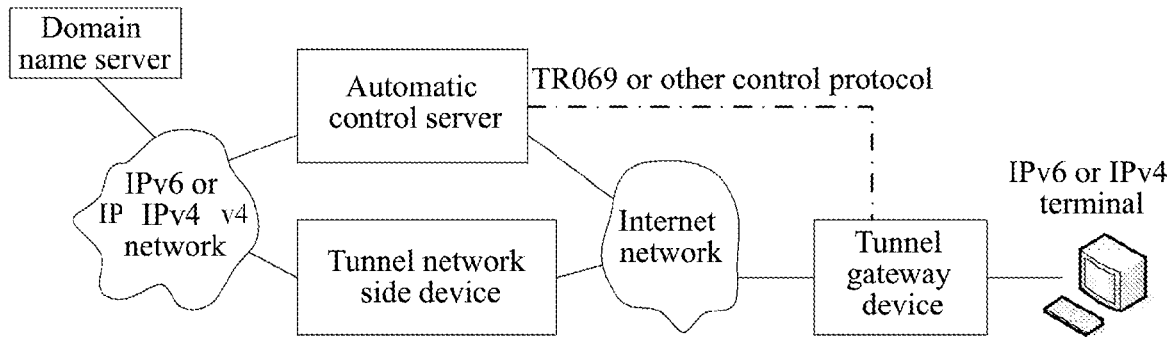
FIG. 1 is a basic network diagram of restraining an IPv6 evolution in a tunnel way according to an embodiment of the present invention.

There are two methods for obtaining the DNS provided by the embodiment of the present invention:

in the first method:

an automatic control server configures a domain name system (DNS) server address for an inner layer of a tunnel on a tunnel gateway device through a management protocol; and the tunnel gateway device sends the configured DNS server address to the client.

Alternatively, the client sends the DNS request to the DNS server, the DNS server responds to the DNS request and returns the corresponding IP address information to the client, wherein, the information interacted between the client and the DNS server is transparently forwarded by the tunnel gateway device.

Wherein, the management protocol is a TR069 protocol or other terminal control protocol.

Wherein, the tunnel gateway device supports a slight-level dual stack-lite (DS-LITE) and/or IPv6 rapid deployment (6rd) technology.

Wherein, the tunnel gateway device sends the DNS server address to the client when distributing the IP address for the client.

In the second method:

an automatic control server configures a domain name system (DNS) server address of an inner layer or outer layer service network of a tunnel on a tunnel gateway device through a management protocol; and the tunnel gateway device regards an own address as the DNS server address and sends the address to the client.

Further, the tunnel gateway device receives the DNS request of the client, responds to the DNS request, obtains the corresponding IP address information from the local or the DNS server, and returns the corresponding IP address information to the client.

Wherein, the tunnel gateway device obtains the corresponding IP address information from the local or the DNS server according to the following way:

after receiving the DNS request, searching DNS items stored locally, when there is a matched DNS item in local, obtaining the corresponding IP address information according to the matched DNS item; when there is no matched DNS item in local, obtaining the matched DNS item from the configured DNS server of the inner layer or outer layer service network of the tunnel, and obtaining the corresponding IP address information according to the matched DNS item.

Wherein, obtaining the matched DNS item from the DNS server includes: the tunnel gateway device initiating the DNS request to the DNS server, the DNS server returning the DNS response, and the response carrying the IP address information.

If the tunnel gateway device does not store the DNS item in local, the gateway device obtains the matched DNS item from the DNS server, and obtains the corresponding IP address information according to the matched DNS item.

Wherein, the management protocol is a TR069 protocol or other terminal control protocol, the tunnel includes the IPv6 and the IPv4 tunnel. As to the DS-LITE, the outer layer of the tunnel is the IPv6 encapsulation, and the inner layer is the IPv4 data; as to the 6rd, the outer layer of the tunnel is the IPv4 encapsulation, and the inner layer is the IPv6 data.

Wherein, the tunnel gateway device regards its own address as the DNS server address and sends the address to the client when distributing the IP address for the client.

Wherein, the tunnel gateway device further stores the DNS item obtained from the DNS server, and, when storing the DNS item, if the local DNS item record is already full, then it deletes the local DNS item according to aging policy, for example, storage time and use frequency of the DNS item.

Some DNS items can be pre-stored on the tunnel gateway device, used for responding to the DNS request sent out by the client.

Wherein, the tunnel gateway device supports a slight-level dual stack-lite (DS-LITE) and/or an IPv6 rapid deployment (6rd) technology.

The both ends if the tunnel shown in FIG. 1 include the tunnel gateway device and the tunnel network side device; the automatic control server manages the tunnel gateway device, connecting through the internet; the tunnel gateway device can be connected through the IPv6 or IPv4 network, and the domain name server (DNS server) used for the service in the inner layer of the tunnel lies in the IPv6 or IPv4 network.

The tunnel technology includes the DS-LITE and the 6rd; as to the DS-LITE, the client is the IPv4 terminal, the internet network is the IPv6 network. The tunnel gateway device implements the encapsulation and transmission of the IPv4 service, and the tunnel network side device transmits the IPv4 service to the IPv4 network after decapsulation. As to the 6rd, the client is the IPv6 terminal, the internet network is the IPv4 network, the tunnel gateway device implements the encapsulation and transmission of the IPv6 service, and the tunnel network side device transmits the IPv6 service to the IPv6 network after decapsulation.

The client needs to send the DNS request to obtain the corresponding relation of the domain name and the IP address when connecting the internet, and the DNS server is generally set in a static state or assigned dynamically, the tunnel gateway device can be regarded as the DNS Server to provide the domain name service, and after the client initiates the DNS request, the tunnel gateway device responds to the DNS request. Because the equipment capacity of the tunnel gateway device is limited, and it must interact with other network side DNS Servers to meet the DNS request initiated by the client, the tunnel gateway device needs to obtain the address of the network side DNS server.

The present invention uses the automatic control server to provide the address configuration of the DNS Server, and as to the tunnel gateway device of the DS-LITE or the 6rd, the same configuration way is adopted to implement the address configuration of the network side DNS server.

Figure 2:
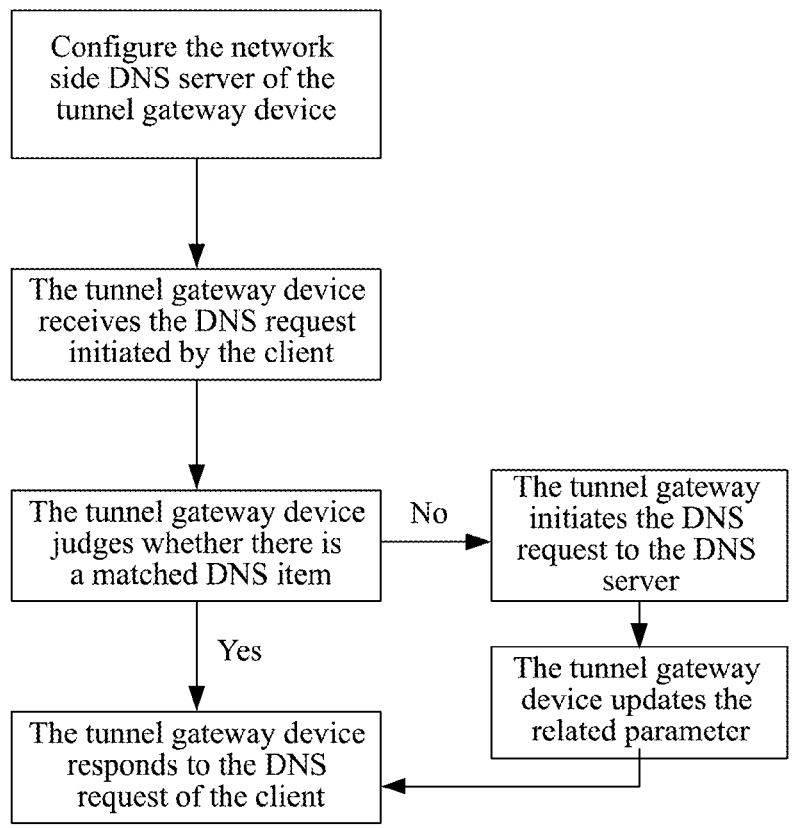
FIG. 2 is a flow of configuring a gateway device DNS server and obtaining a client DNS according to an embodiment of the present invention.

As shown in FIG. 2, the method for obtaining the DNS provided in the present invention includes:

configuring a corresponding address of the network side DNS server in the tunnel gateway device through the management protocol at first, and the address is the destination address used for the sent DNS request of the tunnel gateway device.

The tunnel gateway device receives the DNS request initiated by the client;

the tunnel gateway device searches the local DNS item at first, if there is no matched DNS item, the tunnel gateway device initiates the DNS request to the DNS server, the DNS server responds to the DNS request and returns the DNS item to the tunnel gateway device; the tunnel gateway device obtains the DNS item, the DNS item can be buffered locally and responded to the client. Because the buffer memory of the tunnel gateway device is limited, after the local buffer record is fully recorded, if the new DNS item is reached, it needs to store the new DNS item and delete the local associated DNS item. Deleting the DNS item can be performed successively according to the time of storing the DNS item, and can also be judged according to the level of the use frequency of the DNS item, or both the use frequency and the time are used as the condition for deleting.

If the tunnel gateway device does not store the DNS item locally, the gateway device obtains the matched DNS item from the DNS server, and obtains the corresponding IP address information according to the matched DNS item.

Embodiment 1

Figure 3:
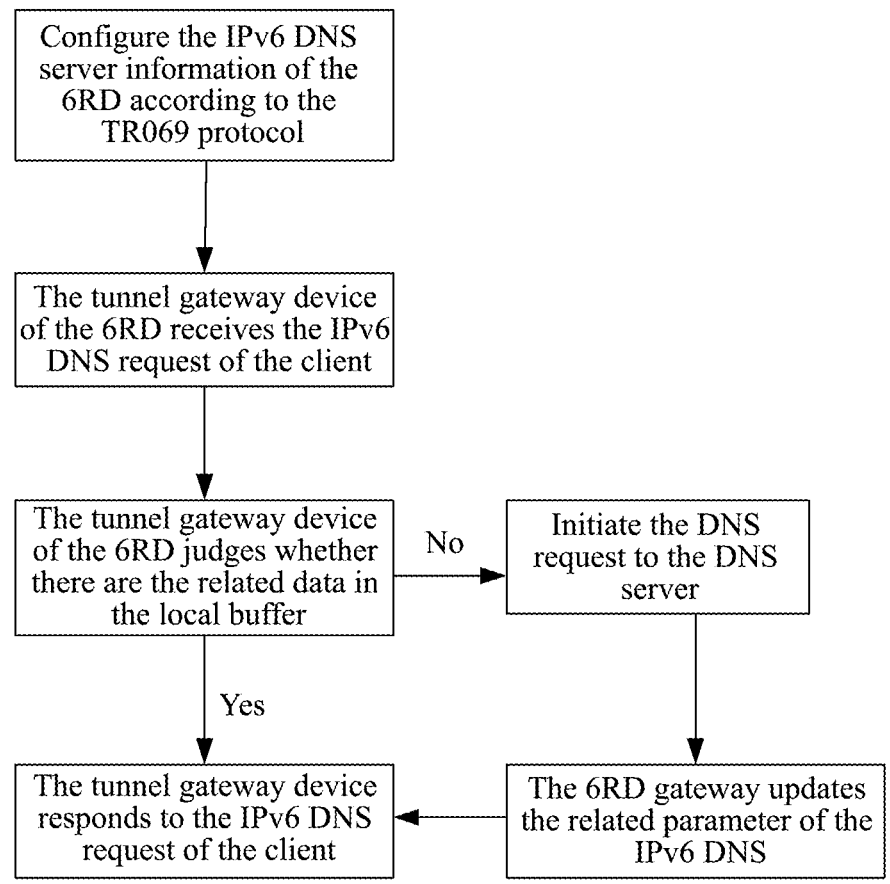
FIG. 3 is a flow of configuring 6RD tunnel gateway device DNS server and obtaining a client DNS according to an embodiment of the present invention.

As shown in FIG. 3, as to the 6rd gateway, after the client initiates the IPv6 DNS request, the gateway device searches the local DNS item at first, if there is no matched DNS item, then the tunnel gateway device initiates the IPv6 DNS request and sends the request to the network side IPv6 or IPv4 server according to its own IPv6 or IPv4 address, if the request is sent according to the IPv6 address, the sent DNS request is the data encapsulated by the IPv4, and the internet network transparently transmits the related data; after the 6rd gateway obtains the DNS record of the IPv6, it responds to the IPv6 DNS request of the client; if the request is sent through the IPv4 address, then the sent DNS request does not need to be encapsulated, but reaches the IPv4 DNS server through the IPv4 network directly.

Embodiment 2

Figure 4:
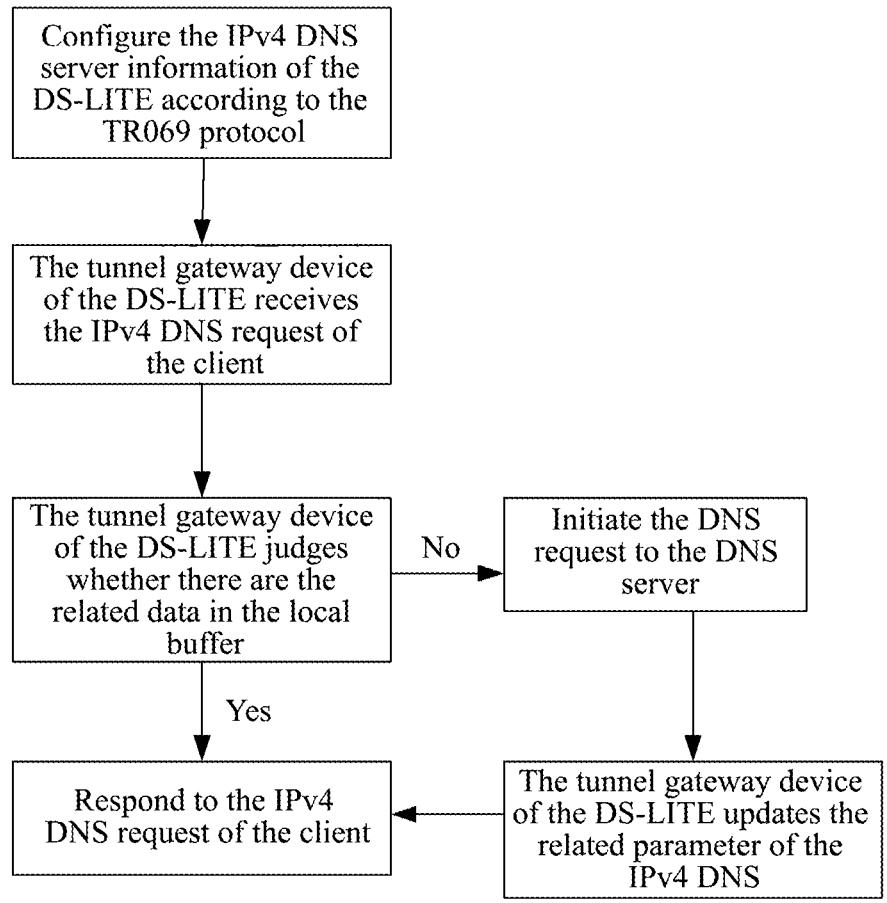
FIG. 4 is a flow of configuring DS-LITE tunnel gateway device DNS server and obtaining a client DNS according to an embodiment of the present invention.

As shown in FIG. 4, as to the DS-LITE gateway, after the client initiates the IPv6 DNS request, the tunnel gateway device searches the local DNS item at first, if there is no matched record, then the tunnel gateway device initiates the IPv4 DNS request and sends the request to the network side IPv6 or IPv4 server according to its own IPv4 or IPv6 address; if the request is sent according to the IPv4 address, the sent DNS request is the data encapsulated by the IPv6, and the internet network transparently transmits the related data; after the DS-LITE gateway obtains the DNS record of the IPv4, it responds to the IPv4 DNS request of the client. If the request is sent according to the IPv4 address, then the sent DNS request does not need to be encapsulated, but reaches the IPv4 DNS server through the IPv4 network directly.

Embodiment 3

In the present embodiment, the automatic control server is used to provide the address configuration of the DNS Server, and as to the tunnel gateway device of the DS-LITE or the 6rd, the same configuration way is used to implement the address configuration of the network side DNS server.

The DS-LITE or 6rd tunnel gateway device distributes the network DNS server address of the inner layer service of the tunnel according to the management protocol; the management protocol includes the TR069 protocol. After the tunnel gateway device obtains the corresponding network DNS server address of the inner layer service of the tunnel, the tunnel gateway device sends the DNS server address of the network of inner layer service of the tunnel to the client. Usually in the process of negotiating the IP address, the tunnel gateway device brings the associated DNS Server address information to the client.

After the client initiates the DNS request, it reaches the tunnel gateway device; the tunnel gateway device does not identify the DNS request, but encapsulates the request into the outer tunnel directly, transparently transmits the DNS request sent by the client to the remote DNS server and transparently transmits the DNS response returned by the DNS server to the client. The tunnel gateway device does not participate in the interactive control of the DNS information, but only perform the transparent transmission.

As to the DS-LITE, the outer layer of the tunnel is the IPv6 encapsulation, and the inner layer is the IPv4 data;

As to the 6rd, the outer layer of the tunnel is the IPv4 encapsulation, and the inner layer is the IPv6 data.

Under the situation of the DS-LITE, the DNS server address of the network of the inner layer service of the tunnel is the IPv4; under the situation of the 6rd, the DNS server address of the network of the inner layer service of the tunnel is the IPv6.

The embodiment of the present invention further provides a tunnel gateway device, configured to:

receive a domain name system (DNS) server address of an inner layer service network of a tunnel configured by an automatic control server through a management protocol; and take an own address as the DNS server address and send the address to a client, or send the DNS server address to the client.

Wherein, the tunnel gateway device further configured to: receive a DNS request of the client, or obtain IP address information corresponding to the DNS request from the local or the DNS server, and return the corresponding IP address information to the client.

Wherein, the tunnel gateway device is configured to obtain IP address information corresponding to the DNS request from the local or the DNS server according to the following way:

after receiving the DNS request, searching DNS item stored locally, when there is a matched DNS item in local, obtaining the corresponding IP address information according to the matched DNS item; when there is no matched DNS item in local, obtaining the matched DNS item from the configured DNS server of the inner layer service network of the tunnel, and obtaining the corresponding IP address information according to the matched DNS item.

If the tunnel gateway device does not store the DNS item locally, the tunnel gateway device obtains the matched DNS item from the DNS server after receiving the DNS request, and obtains the corresponding IP address information according to the matched DNS item.

Wherein, the tunnel gateway device is further configured to: store the DNS item obtained from the DNS server, and when storing the DNS item, if local DNS item record is already full, then delete the local DNS item according to aging policy, for example, storage time and use frequency of the DNS item.

Wherein, the tunnel gateway device is further configured to: receive the DNS request of the client, transparently forward the DNS request to the DNS server, and transparently forward the IP address information returned by the DNS server back to the client.

Wherein, the tunnel gateway device supports a slight-level dual stack-lite (DS-LITE) and/or an IPv6 rapid deployment (6rd) technology.

Wherein, the management protocol is a TR069 protocol or other terminal control protocol.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limited to any specific form of the combination of the hardware and software.

The above description is only the preferred embodiments of the present invention and is not intended to limit the present invention. For those skilled in the art, the present invention can have various modifications and variations. All of modifications, alternative replacements, improvements etc. within the spirit and essence of the present invention should be included in the protection scope of the present invention.

INDUSTRIAL APPLICABILITY

The above-mentioned embodiment provides a method for distributing the DNS server without depending on the address protocol and method for the client obtaining the DNS, the configuration way can be unified by configuring the address of the DNS Server according to the management protocol. The gateway buffers the corresponding DNS item and responds to the DNS request sent by the client, which reduces the request quantity sent to the remote DNS server by the client.

What is claimed is:

1. A tunnel gateway device based on a tunnel, in which both ends of the tunnel include the tunnel gateway device and a tunnel network side device, an automatic control server manages the tunnel gateway device through an internet, the tunnel gateway device is connected to an IPv6 or IPv4 network through the tunnel network side device, and a domain name DNS server which is used for a service in an inner layer of the tunnel lies in the IPv6 or IPv4 network, wherein the tunnel gateway device is configured to:

receive a domain name system DNS server address for an inner layer or an outer layer service of a tunnel configured by an automatic control server according to a TR069 protocol; and when the configured DNS server address is for either the inner layer or the outer layer service of the tunnel and before the client initiates a DNS request, take a tunnel gateway device address as the DNS server address and send the tunnel gateway device address to a client; then, after receiving the DNS request sent by the client, search DNS items stored locally, if there is a matched DNS item in the tunnel gateway device, obtain a corresponding IP address information according to the matched DNS item; if there is no matched DNS item in the tunnel gateway device, send the DNS request to a DNS server according to the configured DNS server address and receive a DNS response returned by the DNS server, so as to obtain the matched DNS item from the DNS server and accordingly obtain the corresponding IP address information according to the matched DNS item;

when the configured DNS server address is only for the inner layer service of the tunnel and before the client initiates a DNS request, send the configured DNS server address to the client; then, after receiving the DNS request sent by the client, not identify the DNS request, but directly encapsulate the DNS request into the outer layer of tunnel, then transparently transmit the DNS request to a DNS server; and transparently transmit a DNS response returned by the DNS server to the client, so that the tunnel gateway device does not participate in the interactive control of the DNS information but only performs the transparent transmission;

wherein the tunnel gateway device supports at least one of a slight-level dual stack-lite (DS-LITE) and an IPv6 rapid deployment (6rd) technology, wherein an IPv6 DNS server of the 6rd is configured according to the TR069 protocol and an IPv4 DNS server of the DS-LITE is configured according to the TR069 protocol.

2. The device according to claim 1, wherein,
the tunnel gateway device is further configured to: store the DNS item obtained from the DNS server, and when storing the DNS item, if local DNS item record is already full, then delete the local DNS item according to an aging policy.

3. A method for obtaining a domain name system DNS based on a tunnel, in which both ends of the tunnel include a tunnel gateway device and a tunnel network side device, an automatic control server manages the tunnel gateway device through an internet, the tunnel gateway device is connected to an IPv6 or IPv4 network through the tunnel network side device, and a domain name DNS server which is used for a service in an inner layer of the tunnel lies in the IPv6 or IPv4 network, wherein the method comprises:

an automatic control server configuring a domain name system DNS server address for an inner layer or an outer layer service of a tunnel on a tunnel gateway device according to a TR069 protocol; and when the configured DNS server address is for either the inner layer or the outer layer service of the tunnel and before the client initiates a DNS request, the tunnel gateway device taking a tunnel gateway device address as the DNS server address and sending the tunnel gateway device address to a client; then, after receiving the DNS request sent by the client, searching DNS items stored locally, if there is a matched DNS item in the tunnel gateway device, obtaining a corresponding IP address information according to the matched DNS item; if there is no matched DNS item in the tunnel gateway device, sending the DNS request to a DNS server according to the configured DNS server address and receiving a DNS response returned by the DNS server, so as to obtain the matched DNS item from the DNS server and accordingly obtain the corresponding IP address information according to the matched DNS item;

when the configured DNS server address is only for the inner layer service of the tunnel and before the client initiates a DNS request, the tunnel gateway device sending the configured DNS server address to the client; then, after receiving the DNS request sent by the client, not identifying the DNS request, but directly encapsulating the DNS request into the outer layer of tunnel, then transparently transmitting the DNS request to a DNS server; and transparently transmitting a DNS response returned by the DNS server to the client, so that the tunnel gateway device does not participate in the interactive control of the DNS information but only performs the transparent transmission;

wherein the tunnel gateway device supports at least one of a slight-level dual stack-lite (DS-LITE) and/or an IPv6 rapid deployment (6rd) technology, wherein an IPv6 DNS server of the 6rd is configured according to the TR069 protocol and wherein an IPv4 DNS server of the DS-LITE is configured according to the TR069 protocol.

4. The method according to claim 3, further comprising, the tunnel gateway device storing the DNS item obtained from the DNS server, and when storing the DNS item, if local DNS item record is already full, then deleting the local DNS item according to an aging policy.

* * * * *